(No Model.)

C. M. WILSON.
LEDGER LEAF OR SHEET.

No. 445,417.  Patented Jan. 27, 1891.

Witnesses:
J. P. Theo Lang.
E. T. Fenwick

Inventor:
Cassius M. Wilson
by his attys
Mason, Fenwick & Lawrence

UNITED STATES PATENT OFFICE.

CASSIUS M. WILSON, OF FAIRCHILD, WISCONSIN.

LEDGER LEAF OR SHEET.

SPECIFICATION forming part of Letters Patent No. 445,417, dated January 27, 1891.

Application filed September 16, 1890. Serial No. 365,171. (No specimens.)

*To all whom it may concern:*

Be it known that I, CASSIUS M. WILSON, a citizen of the United States, residing at Fairchild, in the county of Eau Claire and State of Wisconsin, have invented certain new and useful Improvements in Ledger Leaves or Sheets; and I do hereby declare the following to be a full, clear, and exact description of the invention, such as will enable others skilled in the art to which it appertains to make and use the same.

My invention relates to certain new and useful improvements in ledger leaves or sheets; and it consists in providing a sheet or leaf with certain vertical lines to form columns or spaces, such as date-columns, credit and debit, commodity or account columns, and daily credit and debit amount columns, whereby many advantages over the ordinary ledger-sheet are obtained, as will be hereinafter shown.

In the accompanying drawing I have illustrated my improved ledger leaf or sheet, which is provided with year, month, and day date columns, daily credit and debit commodity or account columns, and daily debit and credit amount columns, said columns being filled in with dates, items of account, and amounts opposite each transaction and a monthly balance struck and the balance carried forward.

In the accompanying drawing, A represents the ledger sheet or leaf, which can be used either as a single or double ledger and for all purposes to which the old-style ledger might have been put, besides possessing many advantages over such ledgers, such as doing away with a large amount of ruling, greatly reducing the liability of mistakes, or, if made, rendering them capable of ready detection. By its use about double the number of entries can be gotten on a page, thereby reducing the number of balances to be struck when the bottom of a page is reached and the consequent forwarding of the same. It is also easier to post to this ledger than to the old style, where the debit is on one side of the folio and the credit on the other; also, in the old style the month and year have to be written in on both the debit and credit sides, while writing them on one side answers for both with the improved ledger.

Running across the sheet and a short distance from the top are suitably-spaced parallel lines $a\ b$, which are divided into spaces by the different vertical column-lines, and in these spaces are preferably placed words or abbreviations to indicate the nature of the column, such as the year, day, or month for the date-columns, "To" and "By" to indicate the debit and credit commodity or account columns, and "Dr." and "Cr." to indicate the debit and credit amount columns. At the top of the sheet and above the headline $a$ a sufficient room is provided for writing in the name of the account and such other matter as may be desired.

At the left-hand end of the sheet or leaf date-columns $c\ d\ e\ f$ are provided for entries made during the year, month, or day. It will be observed that there are two day-columns, one for a debit entry and one for a credit. By this arrangement of a double daily date-column I am enabled to enter a debit and credit amount opposite each other on the same line, notwithstanding said entries may be of different days within the month or year. This feature of my improved ledger is very important, as by its use a large amount of book-room is saved, for the reason that not a line is wasted on account of debit and credit entries of different dates, as in the case of a ledger with a single date-column for both debit and credits. For instance, if debit-postings were made July 1, 2, 3, 4, 6, 8, and 10 and credit-postings were made July 7, 9, 11, 12, 13, 14, and 15, there would be used in the single day-column ledger fourteen lines of ledger-room, while by using two day-columns there would be employed for making the same entries only seven lines. From this it will be seen that in the course of a year a large amount of ledger-room would be saved, which is very important, as it saves a great deal of labor in transferring accounts from page to page, as well as a pecuniary saving secured. By having a single month-column no more time is lost in writing in the dates than in an ordinary ledger, and, in fact, not as much time consumed where the month and year have to be written in on both the debit and credit sides.

To the right of the date-columns are two other columns, one a daily debit commodity or account column and journal-folio marked at its top "To," and the other a daily credit commodity or account column and journal-folio headed "By," for the entry of debit and credit account or commodities, respectively, and to the right of these columns are other columns marked "Dr." and "Cr." for the entry of debit and credit amounts, respectively. By the use of these debit and credit commodity or account columns and the debit and credit amount columns items and amounts can be placed side by side for easy comparison, and thereby ready detection afforded in case of errors occurring, besides saving a large amount of ruling when closing up an account or making a settlement, the old-style ledger requiring about double the amount of ruling in such cases.

By the use of my ledger it is almost impossible to enter a debit as a credit or a credit as a debit without detection. An error of this kind, in order to prevent detection at a glance over the account of the ledger, would have to be entered wrongly in the day-column, wrongly in the commodity-column, and wrongly in the amount-column. Should the entry be made correctly in any one of these columns, the error in the other columns would be seen at once. It would be a very poor accountant who would make a mistake in the day-column, in the commodity-column, and in the amount-column without discovering his error. The chances are that he would enter the item correctly in at least one of the columns, and in that case the error would be very apparent when the ledger was examined. It is obvious that these leaves or sheets may be bound together to form a ledger-book.

What I claim as my invention is—

1. A ledger leaf or sheet having rulings for one or more accounts, each account being provided with two daily date-columns, one of which is for a debit and the other for a credit entry, whereby debit and credit entries of different dates, as well as those of the same date, can be entered on the same horizontal line, substantially as described.

2. A ledger leaf or sheet provided with rulings for one or more accounts, each account having two daily date-columns, one of which is for a debit and the other for a credit entry, a single year-column, and a single month-column, substantially as described.

3. A ledger leaf or sheet having rulings for one or more accounts, each account being provided with two daily date-columns, one of which is for a debit and the other for a credit entry, a single year-column, and a single month-column, two item or commodity columns, one of which is for credit and the other for debit entries, and two amount-columns, one of which is for debit and the other for credit amounts, substantially as described.

In testimony whereof I hereunto affix my signature in presence of two witnesses.

CASSIUS M. WILSON.

Witnesses:
WM. F. HOOD,
O. A. FOSTER.